2,817,693

PRODUCTION OF OILS FROM WAXES

Jacob Koome, Amsterdam, Netherlands, and George M. Good, Berkeley, Calif., assignors to Shell Development Company, New York, N. Y., a corporation of Delaware No Drawing. Application March 21, 1955
Serial No. 495,764

Claims priority, application Netherlands March 29, 1954

8 Claims. (Cl. 260—683.5)

This invention relates to an improvement in the production of oil from waxy hydrocarbons, by which is meant normally solid hydrocarbons as well as so-called waxy distillates containing at least 20% or preferably 50% or more of hydrocarbon waxes. The oil content of hydrocarbon waxes is determined according to ASTM method D 721-51T.

In U. S. Patents Nos. 2,668,866 and 2,668,790, it is disclosed that valuable oils may be produced from hydrocarbon waxes, sometimes loosely called paraffin waxes, by treating them either in the vapor phase or the liquid phase in the presence of hydrogen with a platinum catalyst, e. g. platinum supported on alumina. Nickel or palladium can be substituted in whole or in part for the platinum. The operation is usually carried out at temperatures between about 300° C. and 500° C. and at pressures between about 50 and 3000 p. s. i. The oil is produced largely through isomerization reactions with only minor amounts of cracking.

As shown in co-pending application Serial No. 417,522, of G. M. Good and C. N. J. de Nooijer, filed March 19, 1954, high grade oil can also be produced from such starting material in essentially the same manner and under essentially the same conditions using a much less costly catalyst comprising molybdena, alumina and fluorine. According to Netherlands patent application No. 177,293, other metals, especially the oxides or sulfides of group VI, left column, and/or group VIII of the periodic system may also be applied for this purpose when applied on a carrier of an acid nature which may be induced through the incorporation of a halogen, preferably fluorine.

In the investigation leading to and concerning the inventions described above, the effect of variation in the process conditions, e. g. contact time, temperature, pressure, amount of hydrogen, etc., was investigated. Regarding the pressure, it was found that the desired conversion to oil is somewhat greater at lower pressures than at higher pressures, although the difference is not great. The choice of pressure was therefore dictated primarily by other considerations. Thus, if the pressure was reduced below a certain value which depended upon the particular feed, catalyst, and temperature used, the catalyst tended to decline in activity with use and this herefore set the lower practical limit generally around 10 atmospheres.

In this previous work the various catalysts used were usually pretreated with hydrogen in the manner customary for such catalysts, which was to heat the catalyst up to the desired reaction temperature while contacting it with hydrogen under the pressure to be subsequently used in the process. When the catalyst was at the reaction temperature, the feed was then cut in and the process started.

The present invention is an improvement in the process described. It has now been found that whereas the yield of oil declines somewhat as the pressure in the reaction zone is increased, the yield is materially increased if the catalyst is pretreated with hydrogen at a pressure substantially above that to be used in the process. Thus, if it is desired to operate at 20, 30 or 40 atmospheres pressure, it is advantageous to pretreat the catalyst with hydrogen at a pressure of 50 atmospheres or at least 10 atmospheres above that to be used. More important, it has been found that it is not essential to give the catalyst a special pretreatment with hydrogen if the operation is initiated at a high pressure and then after a period of time the pressure is reduced to the operating pressure. Both treatments can be applied. Thus, for example, the catalyst is advantageously brought up to the desired temperature in the presence of hydrogen either at lower or higher pressure whereupon the conversion of wax is initiated at a high pressure for a time, e. g. 50 to 150 hours, after which the pressure is reduced to the desired operating pressure and the process continued under otherwise the same conditions. This results, it is found, in a large unexplainable increase in the yield of oil with substantially no change in the desirable properties of the oil produced. Thus, for example, if it is desired to operate at 35 atmospheres pressure, the operation is initiated at a pressure of, for example, 50 atmospheres and after several hours, e. g. 70 hours, the pressure is reduced to the desired 35 atmospheres, the other conditions remaining the same. This results in an increase in the oil production (as compared to operating throughout at 35 atmospheres) of about 40%.

The process of the invention is otherwise carried out with the stated starting materials, with the various catalysts and process conditions described in the mentioned patents and patent application and the product, although increased in quantity, is of substantially the same high quality.

The conversion of the wax may be carried out in either the vapor phase or in the liquid phase. When operating with the wax in the liquid phase, the so-called trickle technique, according to which the material to be treated flows downward as a thin layer along with the hydrogen over a fixed, foraminous bed of the catalyst, is most advantageous and is especially suitable when treating starting materials which are of such high molecular weight that they cannot be vaporized in commercial equipment without excessive cracking, e. g. paraffin waxes of average weight above 350. The more favorable reaction conditions vary somewhat according to the starting material and catalyst used. The reaction proceeds most favorably, especially when working in the liquid phase, with temperatures of from 400 to 440° C., pressures between 20 and 40 atmospheres, contact times between about 0.5 to 10 minutes, and throughput rates of from 1 to 5 kilograms of starting material per liter of catalyst per hour. The mol ratio of hydrogen to hydrocarbon is preferably from about 10 to 60.

The process is particularly useful when the catalyst used is one which contains about 1% or less by weight of platinum supported on alumina prepared, for example, by impregnating alumina with an aqueous solution of chloroplatinic acid, drying and calcining. The catalyst may be promoted by incorporation of chlorine or fluorine. The described effects are greatest with these catalysts. It is not, however, limited to these catalysts and can also be successfully applied with the other isomerizing catalysts mentioned above, which are characterized by having hydrogenating-dehydrogenating promoters in combination with an acidic support.

By means of the process, considerably higher yields of oil can be obtained than by operating with the same catalysts which have not been pre-conditioned with hydrogen or have been pre-conditioned in the conventional way, the reaction conditions remaining otherwise the same. Thus, when converting a paraffin wax boiling above 300° C. and having an average molecular weight above 350, with a platinum catalyst containing about 0.3% platinum, about 0.5% halogen and the remainder alumina, the yield of oil may be increased by approximately 10 to 20% through appropriate pretreatment with hydrogen and by another approximately 10 to 20% by initiating the process at a higher pressure than used subsequently during the process. Cracking reactions leading to the formation of lower molecular weight products only occur to a slight degree and the conversion efficiency, which may amount to 85 to 95% or even more, is at least as high as when operating in the previously used manner. The conversion efficiency is defined as the percentage by weight of the liquid oil product having the same molecular weight as the starting material, based on the total amount of starting material converted to all products. The viscosities, viscosity indexes, and pour points of the oils produced are not significantly different from those produced at lower yields according to the previous practice.

*Example*

A solid paraffin wax having a melting point of 54° C., a boiling point above 300° C. and average carbon number of 27 was passed at a throughput rate of 2 kilograms per liter of catalyst per hour together with 10 moles of hydrogen per mole of parffin wax at 420° C. and a pressure of 35 atmospheres in a downward direction over a granular platinum catalyst consisting essentially of about 0.3% platinum and 0.5% halogen on alumina.

The product was distilled to remove cracked products boiling below 300° C. (about 5.7% of the starting wax) and then dewaxed at —5° C. There was thereby obtained 48.1% of oil based on the starting wax. The oil had a pour point of 9° C., a viscosity index of 157, and viscosities of 11.7 centistokes at 100° F. and 3.2 centistokes at 210° F. The efficiency of conversion of wax to oil was 88.4%.

When the same catalyst was pretreated by heating it up to the reaction temperature during a period of 8 hours at atmospheric pressure while passing a quantity of 1000 liters of hydrogen per liter of catalyst per hour and was then used for the conversion of the same wax under the same conditions, the corresponding results were as follows:

| | | |
|---|---|---|
| Yield of oil | percent | 44.6 |
| Pour point | ° C | 8 |
| Viscosity index | | 157 |
| Viscosity at 100° F | cs | 11.6 |
| Viscosity at 210° F | cs | 3.2 |
| Conversion efficiency | percent | 88 |

With all other conditions remaining the same, the operation was repeated except that the catalyst was heated up to the reaction temperature with hydrogen at a pressure of 35 atmospheres instead of 1 atmosphere. The corresponding results were as follows:

| | | |
|---|---|---|
| Yield of oil | percent | 55 |
| Pour point | ° C | 8 |
| Viscosity index | | 156 |
| Viscosity at 100° F | cs | 11.5 |
| Viscosity at 210° F | cs | 3.0 |
| Conversion efficiency | percent | 90 |

In a further case the catalyst was pretreated with hydrogen at 35 atmospheres as described immediately above, and then used in the conversion of the same starting material and under the same conditions, except that the pressure at the beginning of the conversion was initially held at 50 atmospheres for approximately 70 hours, after which it was reduced to the desired operating pressure of 35 atmospheres. The corresponding results were as follows:

| | | |
|---|---|---|
| Yield of oil | percent | 66 |
| Pour point | ° C | 8 |
| Viscosity index | | 151 |
| Viscosity at 100° F | cs | 11.9 |
| Viscosity at 210° F | cs | 3.2 |
| Conversion efficiency | percent | 90 |

In a further case, the catalyst was brought up to the reaction temperature while passing 1300 liters of hydrogen per liter of catalyst per hour at a pressure of 50 atmospheres and the thus pretreated catalyst was used for the conversion of the same wax under the same conditions, except that the initial pressure was 50 atmospheres for a period of 130 hours. At the end of 130 hours the yield of oil was 51%.

At this point the pressure was reduced to 35 atmospheres, the other conditions remaining unchanged. The corresponding results were then as follows:

| | | |
|---|---|---|
| Yield of oil | percent | 61 |
| Pour point | ° C | 5 |
| Viscosity index | | 148 |
| Viscosity at 100° F | cs | 11.5 |
| Viscosity at 210° F | cs | 3.1 |
| Conversion efficiency | percent | 90 |

We claim as our invention:

1. Process for the conversion of paraffin waxes having a boiling point of at least 300° C. to oil by catalytic isomerization in the presence of a single mass of solid isomerization catalyst in a single reaction zone at a temperature between 300 and 500° C. in the presence of hydrogen under a superatmospheric operating pressure, characterized in that the catalyst is treated with hydrogen at a pressure at least 10 atmospheres above the said operating pressure prior to use.

2. Process according to claim 1 further characterized in that the catalyst is treated before use with hydrogen at a pressure of about 35 to 50 atmospheres and is then used in the process at a decreased superatmospheric pressure.

3. Process for the conversion of paraffin waxes having a boiling point of at least 300° C. to oil by isomerization with a single mass of solid isomerization catalyst in a single reaction zone at a temperature between 300 and 500° C. in the presence of a superatmospheric operating pressure of hydrogen, characterized in that the process is initiated at a higher pressure of about 35 to 50 atmospheres for a period of about 50 to 150 hours, after which the pressure is substantially reduced to an operating pressure in the range of 20 to 40 atmospheres.

4. A process for the conversion of paraffin waxes having a boiling point of at least 300° C. to oil by catalytic isomerization in the presence of a single mass of solid isomerization catalyst in a single reaction zone at a temperature between 300 and 500° C. in the presence of hydrogen under a superatmospheric pressure, characterized in that the catalyst is initially subjected to a pressure of at least 10 atmospheres above the steady-state operating pressure.

5. A process according to claim 1 in which the catalyst comprises platinum supported on alumina.

6. A process according to claim 2 in which the catalyst comprises platinum supported on alumina.

7. A process according to claim 3 in which the catalyst comprises platinum supported on alumina.

8. A process according to claim 4 in which the catalyst comprises platinum supported on alumina.

References Cited in the file of this patent

UNITED STATES PATENTS

| | | |
|---|---|---|
| 2,394,803 | Peery | Feb. 12, 1946 |
| 2,668,866 | Good et al. | Feb. 9, 1954 |
| 2,668,790 | Good et al. | Feb. 9, 1954 |
| 2,689,208 | Murray et al. | Sept. 14, 1954 |
| 2,718,535 | McKinley et al. | Sept. 20, 1955 |